United States Patent [19]

Pratt

[11] Patent Number: 5,014,441

[45] Date of Patent: May 14, 1991

[54] ANGLE MEASURING APPARATUS

[76] Inventor: Jerry D. Pratt, 9333 Loma Vista Dr., Dallas, Tex. 75243

[21] Appl. No.: 493,656

[22] Filed: Mar. 15, 1990

[51] Int. Cl.⁵ ............................................. G01B 5/20
[52] U.S. Cl. .................................................. 33/561.1
[58] Field of Search ........................ 33/561.1, 365, 377

[56] References Cited

U.S. PATENT DOCUMENTS

| | | |
|---|---|---|
| 787,142 | 4/1905 | Barnett . |
| 2,022,628 | 11/1935 | Whitney . |
| 2,266,457 | 12/1941 | Wolff ................................ 33/561.1 |
| 2,584,917 | 2/1952 | Powell ................................ 33/377 |
| 2,669,029 | 2/1954 | Ries ................................... 33/377 |
| 2,759,271 | 8/1956 | Von Duyke . |
| 2,821,792 | 2/1958 | Marzani . |
| 4,715,124 | 12/1987 | Hamington . |

FOREIGN PATENT DOCUMENTS 242552 11/1925 United Kingdom ............... 33/561.1

Primary Examiner—Harry N. Haroian
Attorney, Agent, or Firm—Henderson & Sturm

[57] ABSTRACT

An angle measuring apparatus (10) for determining the angular orientation of the external surface of an article (100) relative to a known reference plane wherein the apparatus (10) includes two separable housing members (15) (16) having indicia (20) (20') representative of angular orientations with regard to the horizontal and vertical planes respectively wherein the housing members (15) (16) slideably surround a stack (40) of slideable strips (41) bearing discrete markings (42); whereby the strips will conform to the surface of an article (100) such that the discrete markings (42) will produce a visual indication of the angular disposition of the article surface relative to a known reference plane; and wherein at least one of the housing members (15) is provided with a transparent sealed chamber (70) which is operatively associated with the indicia (20') for giving a visual indication of the angular orientation of the housing member (15).

11 Claims, 6 Drawing Sheets

ANGLE MEASURING APPARATUS

TECHNICAL FIELD

The present invention relates to the field of measuring devices in general, and in particular to a sliding member profile conforming measuring apparatus which can be used to measure both angles and determine the circumferences of partially obstructed circular objects.

BACKGROUND ART

As can be seen by reference to the following U.S. Pat. Nos. 2,759,271; 787,142; 2,022,628; 4,715,124; and 2,821,792; the prior art is replete with myriad and diverse profile duplicating devices employing a plurality of sliding members disposed in a housing.

While all of the aforementioned prior art constructions are more than adequate for the basic purpose and function for which they have been specifically designed, these prior art devices are likewise deficient in the areas of either not providing a measuring scale in conjunction with the housing; or, when incorporating a measuring scale with the housing only employing a scale which is indicative of length and not of the angular disposition of a given surface with respect to a known reference standard and/or standards.

In addition, this invention also contemplates the incorporation of a sealed liquid chamber into the face of the measuring scale to further facilitate the reading of the angular orientation of the measuring device.

As a consequence of the foregoing situation, there has existed a longstanding need among craftsmen and professionals for an improved version of a profile duplicating apparatus that would emphasize angular dispositions with regard to both horizontal and vertical planes versus pure profile or profile plus length prior art constructions; and, the provision of such a construction is a stated objective of the present invention.

DISCLOSURE OF THE INVENTION

Briefly stated, the angle measuring apparatus that forms the basis of the present invention comprises in general: separable housing units, a detachable level unit which releasably engages diverse surfaces on the separable housing units, and a plurality of profile confirming units that are slideable and selectively engageable with respect to the separable housing units.

As will be explained in greater detail further on in the specification, each of the housing units are provided with angle measuring indicia which are imprinted around the periphery of the respective housing units wherein the indicia on each of the housing units are angularly offset relative to one another so that the indicia on one of housing units will be readily readable in either the vertical or horizontal orientation of the apparatus.

Furthermore each of the housing units are also provided with alignment windows whose purpose and function will be described presently.

The plurality of profile conforming elements comprise a plurality of generally rigid uniform length flat measuring members which are slideable relative to one another and the housing units wherein each of the measuring members are provided with aligned marking elements proximate their respective midpoints.

In addition the marking elements on the measuring members cooperate with the alignment windows on a selected one of the housing units and the level unit to provide an angular reading of the profile of the measured article relative to a given plane of reference.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
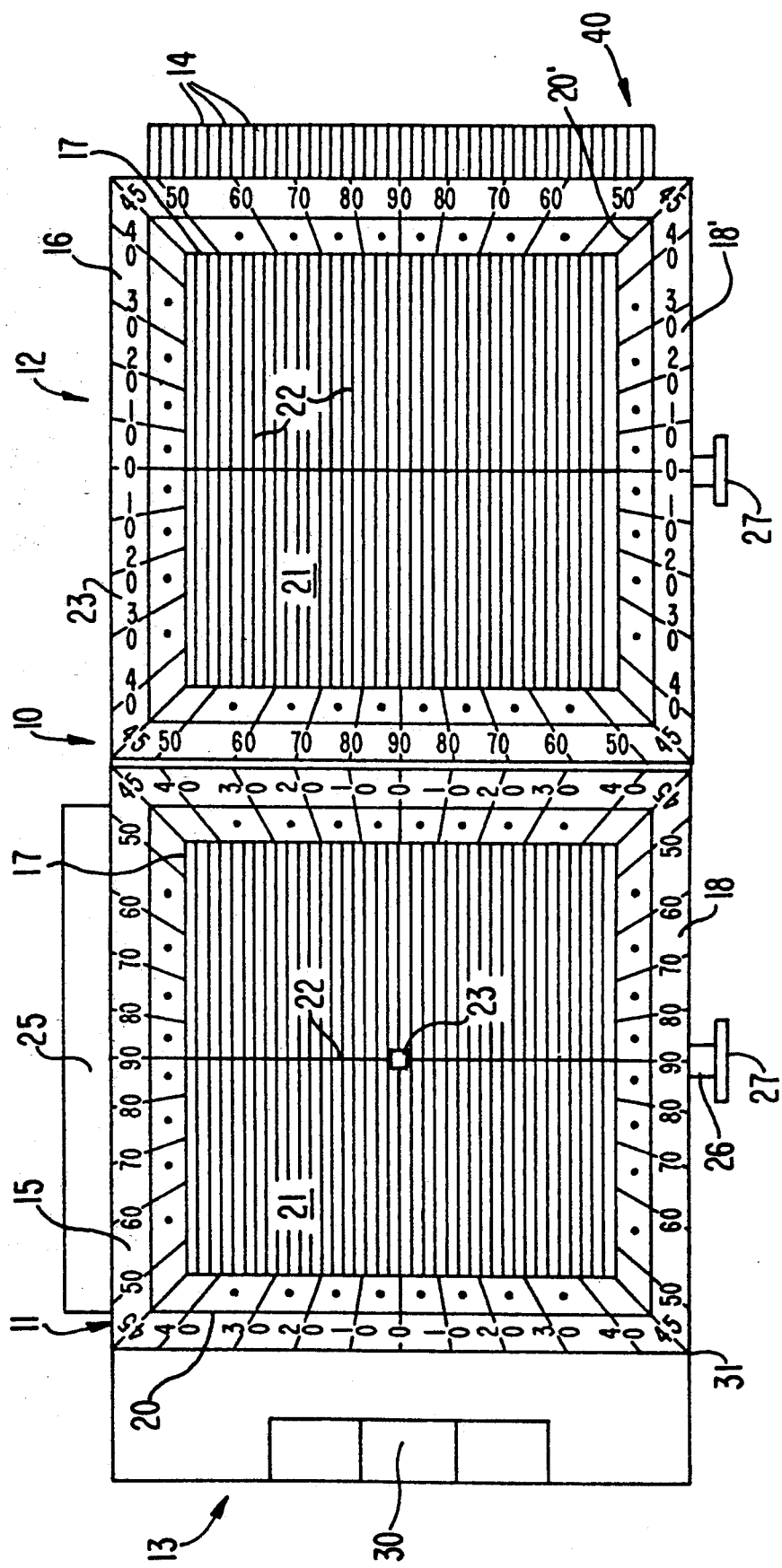
FIG. 1 is a front plan view of the apparatus in the storage mode.

As can be seen by reference to the drawings, and in particular to FIG. 1, the angle measuring apparatus that forms the basis of the present invention is designated generally by the reference numeral (10). The apparatus (10) comprises in general: separable housing units (11) and (12) a detachable level unit (13) and a plurality of profile conforming units (14). These units will now be described in seriatim fashion.

Figure 2:
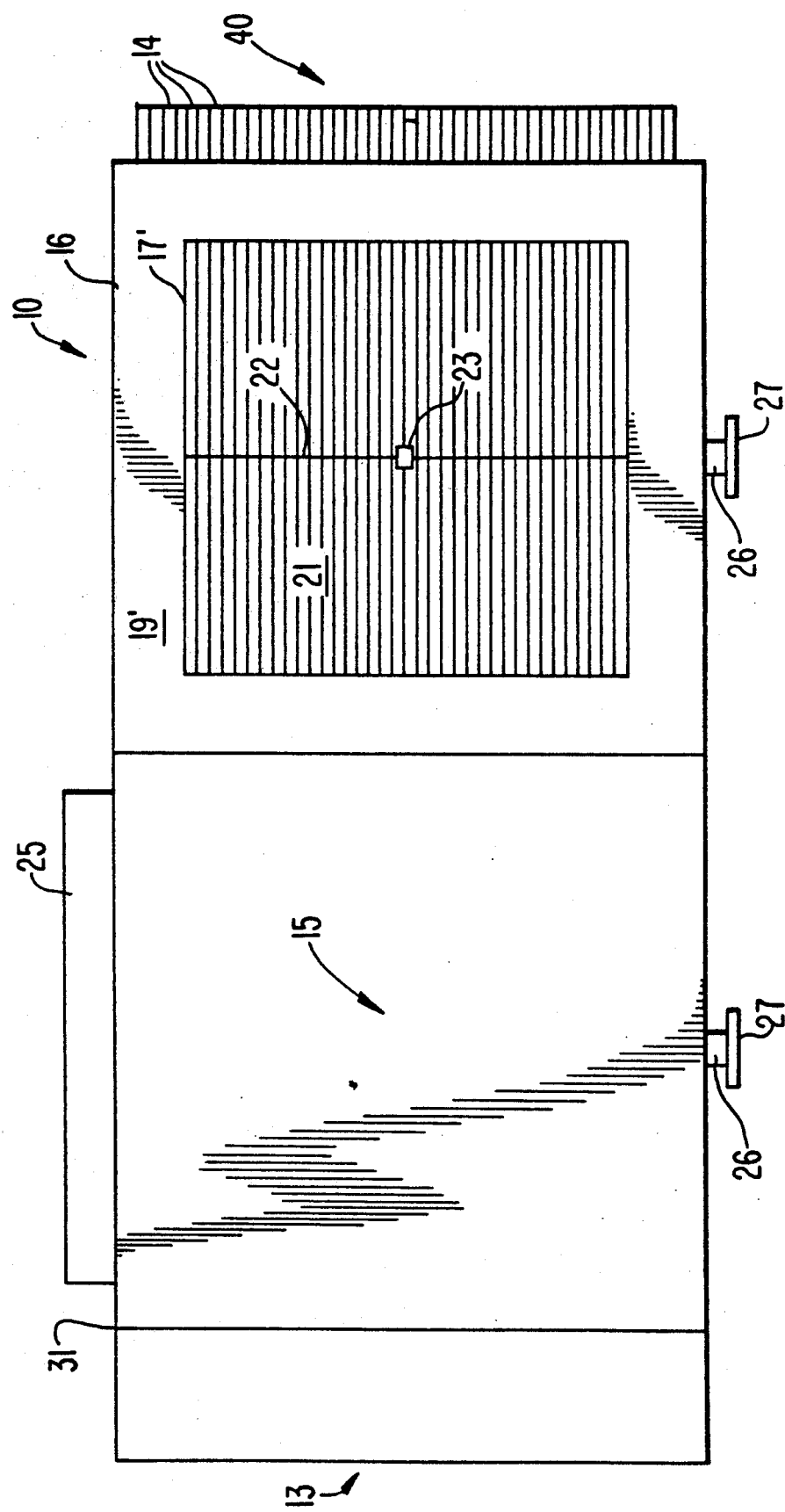
FIG. 2 is a rear plan view of the apparatus in the storage mode.

As shown in FIGS. 1 and 2, the housing units (11) and (12) comprise in general: hollow generally rectangular housing members including a left hand housing member (15) and a right hand housing member (16) each of which is provided with an enlarged generally rectangular opening (17) disposed on its respective front faces (18)(18') wherein the right hand housing member (16) is also provided with an enlarged generally rectangular opening (17') on its rear face (19').

In addition each of the front faces (18)(18') of the housing members (15)(16) are provided with indicia (20)(20') representative of angular orientations relative to a reference plane wherein the indicia (20) on the front face (18) of the left hand housing member (15) is oriented with respect to a horizontal plane taken through the center of the left hand housing member (15); and, the indicia (20') on the front face (18') of the right hand housing member (16) is oriented with respect to a vertical plane taken through the center of the right hand housing member (16).

Furthermore all of the enlarged rectangular openings (17)(17') are provided with transparent panels (21) having a cross-hair marking (22) formed thereon which bisects the respective panels (21) wherein at least some of the cross-hair markings (22) are further provided with a generally square registration marking (23) at the juncture of the cross-hair markings (22) whose purpose and function will be described presently.

Figure 3:
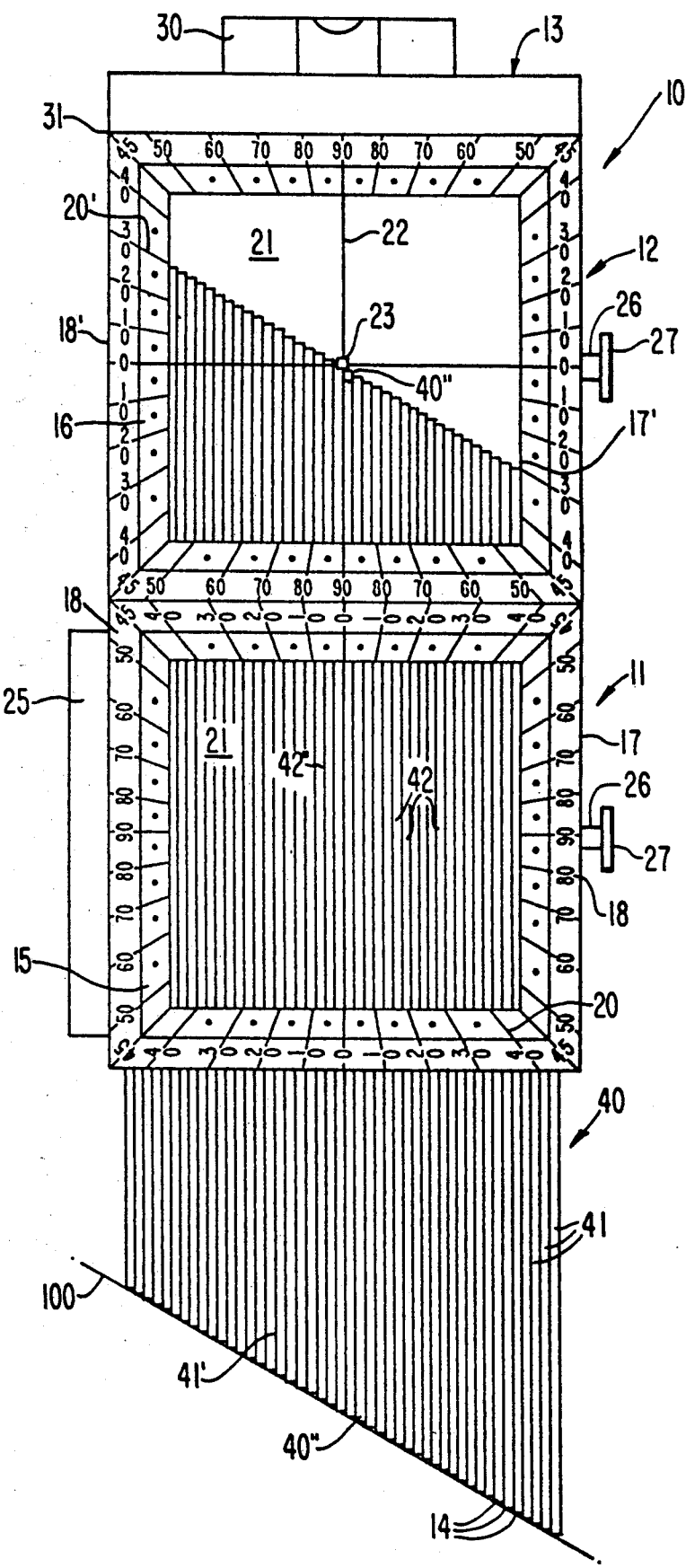
FIG. 3 is a front plan view of the apparatus measuring an angular profile such as a roof line, etc.

Also as can be seen by reference to FIGS. 1 through 3 in the preferred embodiment of the drawings only the panels (21) on the front face (18) of the left hand housing member (15) and the rear face (19') of the right hand housing member (16) are provided with the generally square registration markings (23).

As can best be appreciated by reference to FIGS. 1 through 4 the detachable level unit (13) comprises a liquid level member (30) having means (31) for releasably engaging diverse portions of the periphery of the separable housing units (11) and (12) such that the liquid level member (30) may be displayed in either a vertical or horizontal orientation relative to a selected one of the separable housing units (11) and (12).

In one version of the preferred embodiment (not shown) it is contemplated using magnetic attraction between the level unit (13) and the housing units (11) and (12) as the means (31) for releasably securing the level unit (13) to the housing units (11) and (12). In another version of the preferred embodiment depicted in the drawings it is contemplated that extension element (25) will be provided on the periphery of the housing member (15) wherein the extension element (25) will be received in suitably dimensioned recesses (32) formed in the level unit (13).

Figure 4:
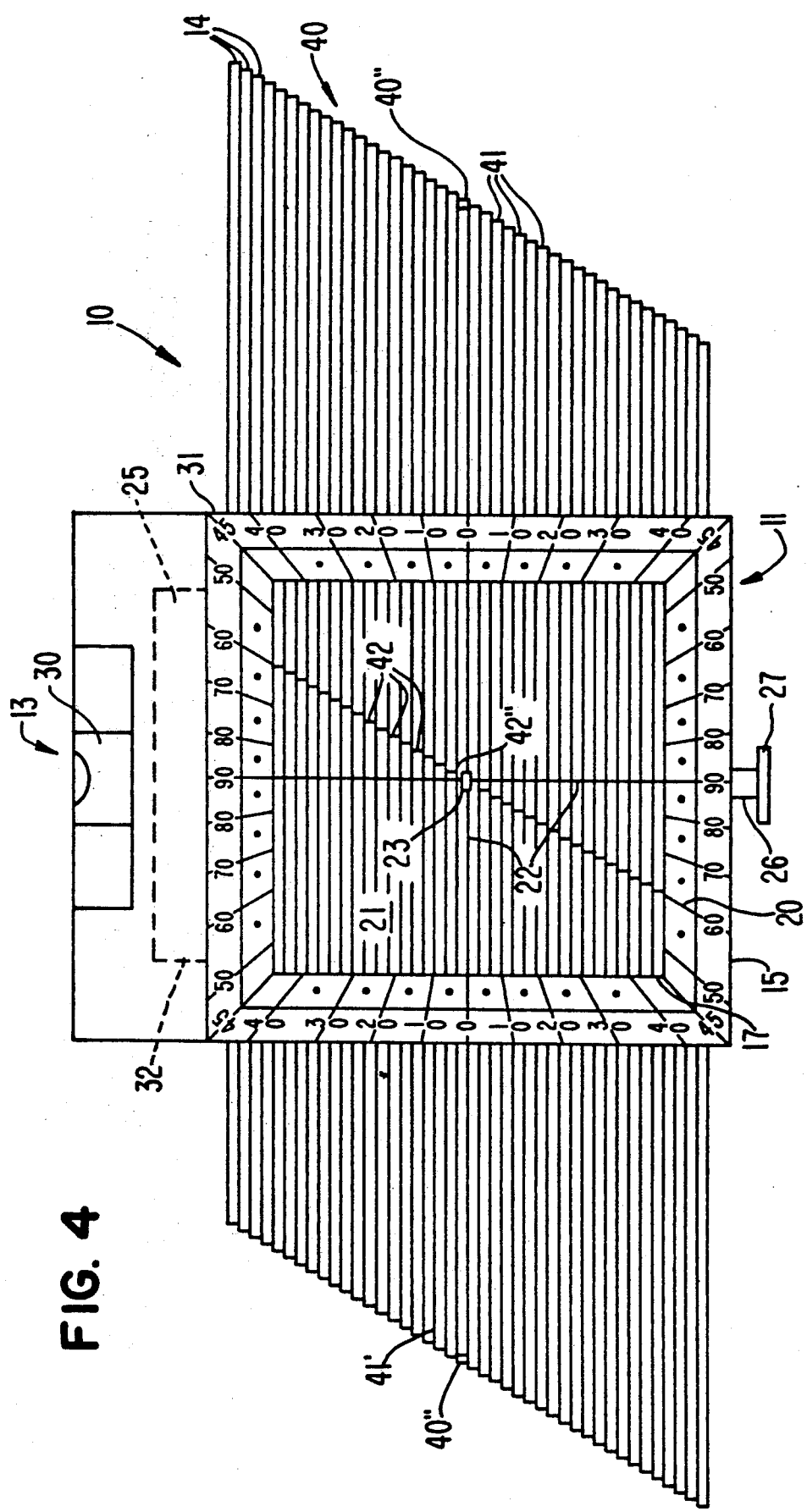
FIG. 4 is an isolated front plan view of one of the housing units registering an angular profile.
Figure 6:
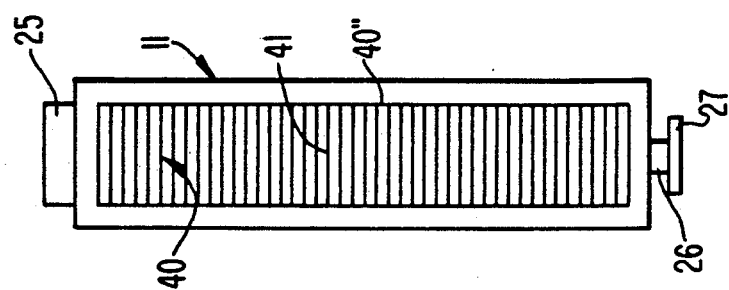
FIG. 6 is an end plan view of the apparatus.

Turning now to FIGS. 3 through 4 it can be seen that the plurality of profile conforming units (14) comprise a stack (40) of generally flat elongated strips (41) preferably fabricated from relatively rigid material such as metal or hard plastic wherein each of the strips (41) are slideable relative to one another and to either or both of the separable housing units (11) and (12).

Furthermore each of the strips (41) are further provided with a discrete marking (42) proximate their midpoint; and, the middle strip (41') of the stack of strips (40) is further provided with marked ends (40") and the midpoint of the middle strip (41') is provided with an enhanced discrete marking (42").

At this juncture it should also be mentioned that each of the separable housing members (15) and (16) are further provided with a locking member (26) such as a screw element (27) which may be employed in a well recognized fashion to immobilize the stack of strips (40) relative to one another in a desired profile.

Figure 5:
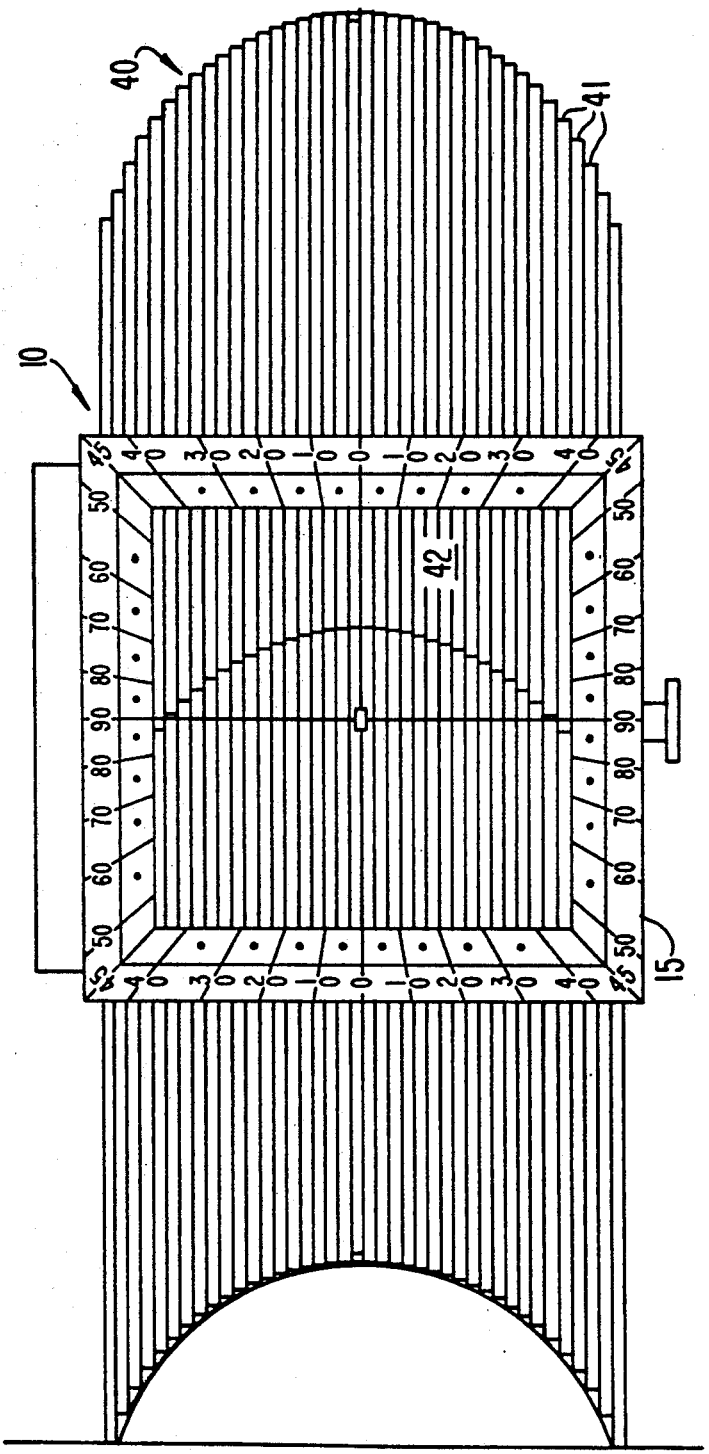
FIG. 5 is an isolated front plan view of one of the housing units registering a curved profile.

Examples of how the apparatus (10) of this invention is employed are depicted in FIGS. 3 through 5. As shown in FIGS. 3 and 4, the apparatus (10) may be employed using either or both of the separable housing members (15)(16) and the level unit (13) may likewise be operatively attached to a selected housing member (15)(16) depending upon the reference plane in which the angular reading is sought.

Once the vertical or horizontal reference plane has been chosen and the level unit(13) has been placed on an appropriate surface for that plane, the housing members (15) and/or (16) are moved relative to the stack (40) of strips (41) so that the strips will project outwardly from either the left side or right side of the apparatus (10).

At this point the stack (40) of strips (41) are brought into engagement with the periphery of an article (100) whose angular orientation relative to the chosen reference plane is sought. Then as the individual strips (41) are displaced relative to one another to conform to the angular inclination of the article (100), the discrete markings (42) and possible the opposite ends of the strips (41) will become aligned accordingly within one or more of the enlarged openings (17)(17') of the housing units (15)(16).

As depicted in FIG. 4, by moving the housing member (15) relative to the stack (40) of strips (41) to bring the enhanced marking (42") into alignment with the appropriate registration marking (23) on the cross-hair markings (22) on the transparent panel (21); and then locking the stack of strips (41) relative to the selected housing unit (11); the remainder of the discrete markings (42) will be aligned with the same angular reading on the indicia (20) on opposite sides of the housing member (15).

It should further be noted that the indicia (20)(20') on the housing units (11) and (12) are representative of graduated angular orientations ranging from 0° to 90°; wherein, the 0° markings and the 90° markings are disposed at the midpoints of the sides of the respective housing units (11) and (12) in an alternating fashion; and, wherein the indicia (20) on housing unit (11) is offset by 90° relative to the indicia (20') on the housing unit (12).

Figure 7:
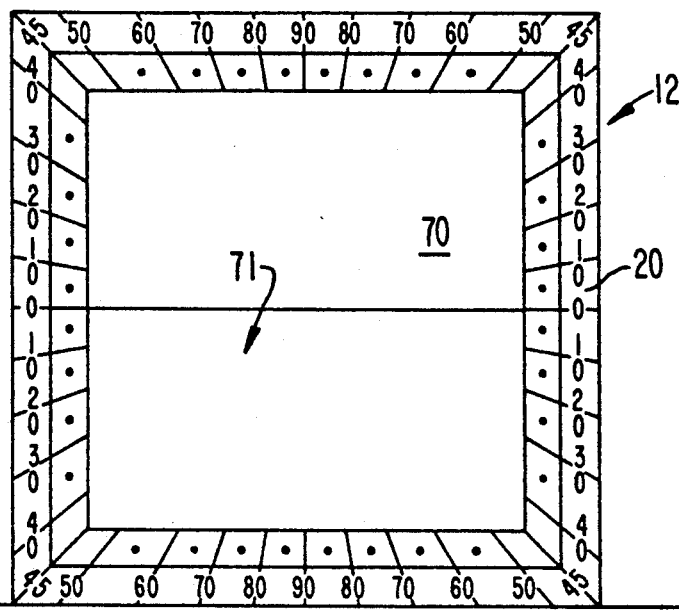
FIG. 7 is an isolated detail view of an alternate version of one of the housing units disposed on a level surface; and, FIG. 8 shows the alternate view of the housing unit disposed on an angle.
Figure 8:
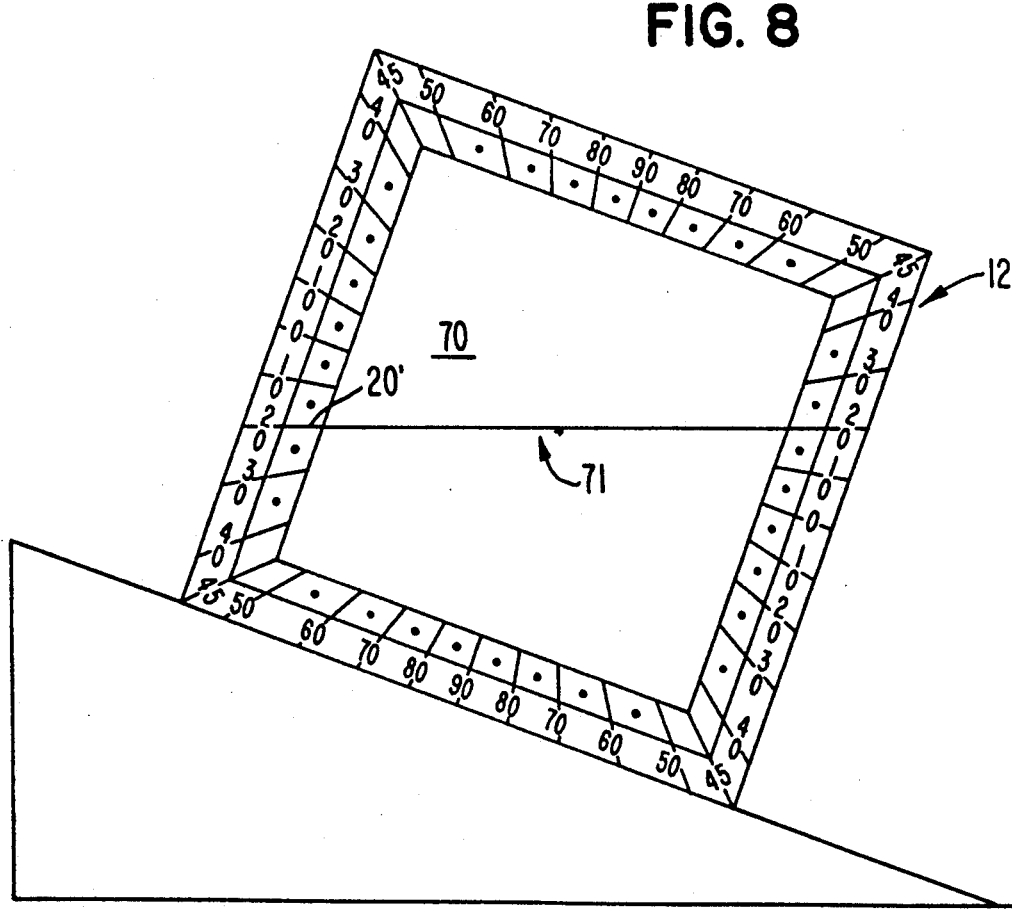

Turning now to FIGS. 7 and 8 it can be seen that in an alternate version of the preferred embodiment, at least one of the housing units (12) is modified to have a sealed liquid chamber (70) within the housing unit (12); wherein, the chamber (70) is partially filled with a liquid (71) such as a light oil; and, wherein the liquid (71) occupies one-half of the fluid volume of the sealed chamber; such that the liquid level will register with the 0° markings of the indicia (20') when the housing unit (12) is resting on a horizontal surface.

Then when the housing unit (12) is placed on an inclined surface as depicted in FIG. 8, the quiescent liquid level will give a visual reading on opposite sides of the housing unit (12) of the angular orientation of the housing unit (12) relative to the horizontal plane.

It should further be appreciated at this juncture that the alternate version of the preferred embodiment depicted in FIGS. 7 and 8 can be manufactured as a separate item to provide a means for simply and easily determining angular orientations.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An angle measuring apparatus for determining the angular orientation of the external, surfaces of an article relative to a known reference plane including a horizontal reference plane and a vertical reference plane wherein the apparatus comprises:
a first housing unit including a first hollow rectangular housing member having at least one enlarged opening wherein the portion of the said first housing member surrounding the enlarged opening is imprinted with indicia representative of an angular orientation relative to a first reference plane;
a plurality of profile conforming units including a stack of elongated strips slideably disposed within said first housing unit wherein each of the strips are slideable relative to one another and provided with discrete markings disposed at their midpoints.

2. The apparatus as in claim 1 further comprising:
a level member having means for releasably securing the level member to an appropriate portion of the first housing member for aligning the housing member with respect to said first reference plane.

3. The apparatus as in claim 1 further including:
a second housing unit including a second hollow rectangular housing member having at least one enlarged opening wherein the portion of the said second housing member surrounding the enlarged opening is imprinted with indicia representative of an angular orientation relative to a second reference plane and wherein the second housing unit slideably surrounds the said stack of strips.

4. The apparatus as in claim 3; wherein, the at least one enlarged openings in the first and second housing units are provided with transparent panels having a marking formed thereon which bisects the said panels.

5. The apparatus as in claim 4 further comprising:
a level member having means for releasably securing the level member to an appropriate portion of a selected one of the first and second housing members for aligning the selected housing member with respect to a selected one of said first and second reference planes.

6. The apparatus as in claim 2; wherein, the first housing member is further provided with a locking member immobilizing the stack of strips relative to one another and said first housing member.

7. The apparatus as in claim 3; wherein, the housing members are both provided with locking members for immobilizing the stack of strips relative to one another and at least one of the housing member.

8. The apparatus as in claim 1; wherein, the indicia surrounding the said enlarged opening are representative of angular orientations ranging from 0° to 90° wherein the 0° markings and the 90° markings are alternately disposed on the mid-point of the sides of the said first housing unit.

9. The apparatus as in claim 8 wherein the first housing member has a front face and the indicia are imprinted on said front face.

10. The apparatus as in claim 9, further comprising a transparent sealed chamber within the said first housing unit; wherein, the sealed chamber is at least partially filled with a liquid.

11. The apparatus as in claim 10; wherein, the liquid occupies one-half of the fluid volume of the sealed chamber.

* * * * *